United States Patent
Bays

(10) Patent No.: US 10,931,574 B2
(45) Date of Patent: Feb. 23, 2021

(54) UNIVERSAL CUSTOMER PREMISE EQUIPMENT

(71) Applicant: AT&T Intellectual Property I, L.P., Atlanta, GA (US)

(72) Inventor: Robert Bays, San Francisco, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/393,665

(22) Filed: Apr. 24, 2019

(65) Prior Publication Data

US 2019/0253347 A1    Aug. 15, 2019

Related U.S. Application Data

(63) Continuation of application No. 14/925,809, filed on Oct. 28, 2015, now Pat. No. 10,348,621.

(60) Provisional application No. 62/072,971, filed on Oct. 30, 2014, provisional application No. 62/075,175, filed on Nov. 4, 2014, provisional application No. 62/241,059, filed on Oct. 13, 2015.

(51) Int. Cl.
*H04L 12/713* (2013.01)
*G06F 9/455* (2018.01)

(52) U.S. Cl.
CPC .. *H04L 45/586* (2013.01); *G06F 2009/45595* (2013.01)

(58) Field of Classification Search
None
See application file for complete search history.

(56) References Cited

U.S. PATENT DOCUMENTS

| | | |
|---|---|---|
| 6,085,215 A | 7/2000 | Ramakrishnan et al. |
| 6,675,218 B1 | 1/2004 | Mahler et al. |

(Continued)

FOREIGN PATENT DOCUMENTS

| | | |
|---|---|---|
| CN | 101036330 A | 9/2007 |
| CN | 107005471 | 8/2017 |

(Continued)

OTHER PUBLICATIONS

"Agile Networking and High Performance", Network Function Virtualization, Brocade Byatta 5600 VRouter, Sep. 2014, 8 pages.

(Continued)

*Primary Examiner* — Jenkey Van
(74) *Attorney, Agent, or Firm* — Guntin & Gust, PLC; Kenneth Kwan

(57) ABSTRACT

Systems, methods, apparatus and computer-readable medium are described for improving efficiency and robustness for processing network packets at a network device, such as a customer premises equipment (CPE). The network device may include a plurality of physical network interfaces for receiving and transmitting network packets, and one or more processing entities. The one or more processing entities may provide a first router for providing routing functionality, wherein the first router is not virtualized, enable a virtual machine to execute a second router for providing routing functionality and forward a network packet using the first router or the second router from the device. The one or more processors may be configured to execute instructions associated with the first router from user space.

17 Claims, 9 Drawing Sheets

(56) References Cited

U.S. PATENT DOCUMENTS

| | | | |
|---|---|---|---|
| 8,799,422 B1* | 8/2014 | Qu | H04L 45/64 709/220 |
| 8,954,968 B1 | 2/2015 | Pohl et al. | |
| 2006/0106934 A1 | 5/2006 | Figaro et al. | |
| 2006/0206300 A1 | 9/2006 | Garg et al. | |
| 2008/0043756 A1 | 2/2008 | Droux et al. | |
| 2008/0155549 A1* | 6/2008 | Blinick | G06F 9/485 718/103 |
| 2009/0300605 A1* | 12/2009 | Edwards | G06F 9/45558 718/1 |
| 2010/0050172 A1* | 2/2010 | Ferris | G06F 9/4856 718/1 |
| 2011/0200184 A1 | 8/2011 | Zalenski et al. | |
| 2012/0120965 A1* | 5/2012 | Khawer | H04L 49/9031 370/412 |
| 2012/0198441 A1 | 8/2012 | Mahdavi et al. | |
| 2012/0324442 A1 | 12/2012 | Barde | |
| 2013/0067466 A1 | 3/2013 | Combs et al. | |
| 2013/0227672 A1 | 8/2013 | Ogg et al. | |
| 2014/0029451 A1 | 1/2014 | Nguyen | |
| 2014/0122678 A1 | 5/2014 | Miner et al. | |
| 2014/0137182 A1* | 5/2014 | Elzur | H04L 63/20 726/1 |
| 2014/0259012 A1 | 9/2014 | Nandlall et al. | |
| 2014/0328159 A1 | 11/2014 | Rebella et al. | |
| 2015/0169340 A1 | 6/2015 | Haddad et al. | |
| 2015/0326535 A1 | 11/2015 | Rao et al. | |
| 2016/0094364 A1* | 3/2016 | Subramaniyam | H04L 12/462 370/401 |
| 2017/0111274 A1 | 4/2017 | Bays et al. | |
| 2019/0306058 A1 | 10/2019 | Bays et al. | |
| 2019/0334767 A1* | 10/2019 | Neginhal | H04L 41/0803 |

FOREIGN PATENT DOCUMENTS

| | | |
|---|---|---|
| EP | 3213470 | 9/2017 |
| WO | 2014072904 A1 | 5/2014 |
| WO | 2016069940 | 5/2016 |
| WO | 2016094825 | 6/2016 |

OTHER PUBLICATIONS

"Cloud Networking: Scaling Data Centers and Connecting Users", Network Function Virtualization, Jan. 2014, 8 pages.

"Control Security, Connectivity, and Compliance in the Cloud", Network Function Virtualization, Brocade Vyatta VRouter for Cloud Computing, Feb. 2014, 4 pages.

"ETSI GS NFV 001 v1.1.1 (Oct. 2013); Network Functions Virtualisation (NFV); Use Cases", ETSI, Available Online At: http://www.etsi.org/deliver/etsi_gs/nfv/001_099/001/01.01.01_60/gs_nfv001v010101p.pdf, Oct. 10, 2013, 50 pages.

"Ex. 1 The Basics of Real-Time Linux", Available Online at: http://www.cs.ru.nl/lab/xenomai/exercises/ex01/Exercise-1.html, Aug. 22, 2011, pp. 1-6.

"Multicast Routing Reference Guide, Vyatta—A Brocade Company/ Vyatta System", Brocade Vyatta 6.6R3, vol. 1, Oct. 2013, 74 pages.

"NAT Reference Guide, Vyatta—A Brocade Company/ Vyatta System", Brocade Vyatta 6.6R3, vol. 1, Oct. 2013, 93 pages.

"Virtual CPE Anuta Networks", Available online at:https://web.archive.org/web/20141015114237/http://www.anutanetworks.com/technologies/virtual-cpe/, Oct. 15, 2014, pp. 1-2.

U.S. Appl. No. 14/925,809 , "Final Office Action", dated Feb. 9, 2018, 24 pages.

U.S. Appl. No. 14/925,809 , "Non-Final Office Action", dated Jul. 3, 2017, 20 pages.

U.S. Appl. No. 14/925,809 , "Non-Final Office Action", dated Aug. 9, 2018, 24 pages.

U.S. Appl. No. 14/925,809 , "Notice of Allowance", dated Feb. 28, 2019, 12 pages.

U.S. Appl. No. 15/338,082 , "Non-Final Office Action", dated Jul. 27, 2018, 6 pages.

U.S. Appl. No. 15/338,082 , "Notice of Allowance", dated Nov. 21, 2018, 9 pages.

U.S. Appl. No. 15/338,082 , "Restriction Requirement", dated May 8, 2018, 6 pages.

Americas Headquarters , "Cisco IOS XRv Router Installation and Configuration Guide", 170 West Tasman Drive San Jose, CA 95134-1706 USA, Available online at: https://www.cisco.com/en/US/docs/ios_xr_sw/ios_xrv/install_config/b_xrvr_432.pdf [retrieved on Jun. 20, 2018], Jan. 31, 2014, pp. 1-38.

EP15793991.9 , "Office Action", dated Feb. 15, 2019, 9 pages.

EP15793991.9 , "Office Action", dated Jun. 26, 2018, 9 pages.

EP15817716.2 , "Office Action", dated May 9, 2018, 4 pages.

Mellah et al., "A Distributed Controller For A Virtualized Router", Journal of Internet Services and Applications, vol. 3, No. 3, Oct. 16, 2012, pp. 311-318.

PCT/US2015/058144 , "International Preliminary Report on Patentability", dated Jan. 26, 2017, 19 pages.

PCT/US2015/058144 , "International Search Report and Written Opinion", dated Jan. 26, 2016, 15 pages.

PCT/US2015/058144 , "Written Opinion", dated Oct. 18, 2016, 9 pages.

Xu , "Revisit the IP stack in Linux with Network Virtualization", DPDK Summit, Available Online At: https://dpdksummit.com/Archive/pdf/DPDK-SFSummit2014-Revisit-TheIPStackInlinuxWithNetworkVirtualization.pdf, Sep. 8, 2014, pp. 1-22.

Notice of Allowance and Fees Due for U.S. Appl. No. 16/292,644, dated Jan. 6, 2020, 8 pages.

First Office Action dated Jan. 13, 2020 for Chinese Application No. 201580056889.8.

Corrected Notice of Allowability for U.S. Appl. No. 16/292,644, dated Apr. 10, 2020, 5 pages.

Notice of Decision to Grant for EP 15793991.9, dated May 4, 2020, 2 pages.

Son , "SDN/NFV-based vCPE Services by AT&T, Verizon and KT", Available Online At:https://www.netmanias.comjen/postjblog/10363/kt-sdn- nfvjsdn-nfv-based-vcpe-services-by-at-t- verizon-and-kt, Aug. 22, 2016, pp. 1-3.

Office Action for EP 17772528.0 dated May 12, 2020, 5 pages.

PCT/US2017/050815 , "International Search Report and Written Opinion", dated Nov. 29, 2017, 17 pages.

Office Action for CN201580056889.8 dated Jul. 17, 2020, 3 pages.

Extended European Search Report for EP20169758.8 dated Jul. 30, 2020, 11 pages.

Bachmutsky, "System Design for Telecommunication Gateways—Chapter 4: Software Technologies and Platform", System Design for Telecommunication Gateways, Dec. 2, 2010, pp. 303-464.

* cited by examiner

UNIVERSAL CUSTOMER PREMISE EQUIPMENT

CROSS REFERENCE

This application is a continuation of U.S. Non-Provisional application Ser. No. 14/925,809, filed on Oct. 28, 2015, titled "UNIVERSAL CUSTOMER PREMISES EQUIPMENT," which claims the benefit and priority of U.S. Provisional Application No. 62/072,971, filed on Oct. 30, 2014, titled "UNIVERSAL CUSTOMER PREMISE EQUIPMENT," U.S. Provisional Application No. 62/075,175, filed on Nov. 4, 2014, titled "UNIVERSAL CUSTOMER PREMISE EQUIPMENT," and U.S. Provisional Application No. 62/241,059, filed on Oct. 13, 2015, titled "UNIVERSAL CUSTOMER PREMISE EQUIPMENT," which are incorporated by reference herein in their entirety for all purposes.

BACKGROUND

The present disclosure generally relates to data routing and forwarding, and more specifically, to techniques for improving efficiency and robustness for configuring, deploying and managing Customer Premises Equipment (CPE).

Traditionally, CPE are devices that provide hardware based solutions for facilitating certain network based services for the customer. In some instances, the CPE provides the demarcation point for the network operator for providing their services to the customer. In other words, the CPE acts as an extension of the network operator, residing at the customer premises and facilitates services provided by the network operator to the customer.

CPE may generally refer to devices such as telephones, routers, switches, residential gateways (RG), set-top boxes, fixed mobile convergence products, home networking adaptors and internet access gateways that enable consumers to access communications service providers' services and distribute them around their house via a LAN (Local Area Network), digital subscriber line (DSL) or other broadband Internet routers, Voice over Internet Protocol (VoIP) base stations or other systems used by particular service providers. Also included are key telephone systems and most private branch exchanges. Traditionally, this term referred to equipment placed at the customer's end of the telephone line and usually owned by the telephone company. Today, almost any end-user equipment can be called customer premises equipment and it can be owned by the customer or by the provider.

Although, a CPE is discussed throughout the specification, in several embodiments, a network device may also be used instead of a CPE to perform several embodiments discussed herein. Furthermore, in some instances, the CPE may itself perform the functions of a network device, such as forwarding of network packets.

SUMMARY

The present disclosure generally relates to data routing and forwarding, and more specifically, to techniques for improving efficiency and robustness for configuring, deploying and managing Customer Premises Equipment (CPE).

Traditionally, once the CPE is physically located at the premises of the customer, any changes to the CPE results in a technician visit to the customer, resulting in higher costs and inconvenience. Furthermore, the CPE usually has to be replaced if a certain functionality or service is not supported by the CPE or if the CPE needs an upgrade resulting in an additional cost to the customer or the network operator. Furthermore, the CPEs are single function devices and the customer may not be able to enable and use multiple services and functionality using the same CPE.

Aspects of the disclosure, discuss techniques for improving efficiency and robustness for routing and forwarding network packets, remotely deploying new services, changing configurations, improving communication between different components of the device and updating/changing certain executable images on the device. Furthermore, aspects of the disclosure may also allow different network operators simultaneous control and upgradability of certain executable images on the CPE.

In certain aspects of the disclosure, an example device comprises a memory, a plurality of physical network interfaces for receiving and transmitting network packets, and one or more processing entities in communication with the memory. The one or more processing entities may be configured to provide a first router for providing routing functionality, wherein the first router is not virtualized, enable a virtual machine to execute a second router for providing routing functionality, and forward a network packet using the first router or the second router from the device. In certain embodiments, the device is a CPE. In other embodiments, the device is a network device. In certain embodiments, forwarding of the network packet at the first router may include performing routing or switching of the network packet. In certain instances, routing may refer to processing and forwarding packets at level 3 (L3) layer of the Open Systems Interconnect (OSI) model networking stack, whereas switching may refer to processing and forwarding of network packets at level 2 (L2) layer of the OSI model networking stack.

In certain embodiments, the one or more processors may be further configured to execute instructions associated with the first router from user space. In certain embodiments, the first router processes network packets in user space using one or more real-time threads allocated by a kernel.

In certain embodiments, the device receives the network packet through one of the plurality of physical network interfaces and copies the network packet to user space for processing by the first router. The device may further processes the network packet at the first router and send the network packet from the first router to the second router, wherein the network packet is communicated to the second router without exiting the device. In certain embodiments, the device updates the state of the virtual machine in response to a change to a data model, wherein the change to the data model is based on a received operational mode command and the data model comprises an interface for exposing updatable parameters associated with the virtual machine. In certain instances, the device is further configured to upgrade the second router executing in the virtual machine.

In certain aspects of the disclosure, an example method for forwarding network packets at a device may include receiving, at a physical network interface of the device, a network packet, copying, using a device driver from kernel, the network packet from the physical network interface to memory accessible by instructions executing from user space; and processing the network packet using a router in the user space of the device for forwarding of the network packet. In certain embodiments, the device is a CPE. In other embodiments, the device is a network device. In certain embodiments, forwarding the network packet comprises transmitting the packet through another physical network interface. In certain other embodiments, forwarding the network packet comprises sending the packet to another router executing in a virtual machine on the device. In certain embodiments, forwarding of the network packet at the first router comprises performing routing or switching of the network packet. In certain instances, routing may refer to processing and forwarding packets at the level 3 (L3) layer of the Open Systems Interconnect (OSI) model, whereas switching may refer to processing and forwarding of network packets at the level 2 (L2) layer of the OSI model.

In certain embodiments, the example method may also include receiving an operational mode command from a remote device, updating parameters of data model based on the operational mode command, and updating state associated with another router executing in a virtual machine on the device, based on the updated parameters of the data model.

In certain embodiments, an example non-transitory computer-readable storage medium, wherein the non-transitory computer-readable storage medium may include instructions executable by a processing entity for receiving a network packet, copying, using instructions executing in a kernel, the network packet from a physical network interface to memory accessible by instructions executing from user space, and processing the network packet using a router in the user space of the device for forwarding of the network packet. Such an example non-transitory computer-readable storage medium store instructions on the device for performing several embodiments discussed throughout the disclosure.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Customer Premises Equipment CPE) is any terminal/device and associated equipment located at a subscriber's premises. In some instances, the CPE is connected with a network operators or carrier's telecommunication channel. The CPE may be connected to the network operator at the at the demarcation point ("demarc"). The demarc is a point established in a building, complex or system to separate customer equipment from the equipment located in either the distribution infrastructure or central office of the network operator.

CPE generally refers to devices such as telephones, routers, switches, residential gateways (RG), set-top boxes, fixed mobile convergence products, home networking adaptors and internet access gateways that enable consumers to access Communications Service Providers' services and distribute them around their house via a LAN (Local Area Network), digital subscriber line (DSL) or other broadband Internet routers, Voice over Internet Protocol (VoIP) base stations or other device provided by a particular service provider. Also included are key telephone systems and most private branch exchanges. Traditionally, this term referred to equipment placed at the customer's end of the telephone line and usually owned by the telephone company. Today, almost any end-user equipment can be called customer premises equipment and it can be owned by the customer or by the provider. In some instances, the CPE may implement one or more components or functionality described with components disclosed in FIG. 9.

Although, a CPE is discussed throughout the specification, in several embodiments, a network device may also be used instead of a CPE to perform several embodiments discussed herein. Furthermore, in some instances, the CPE may itself perform the functions of a network device, such as forwarding of network packets.

Traditionally, once the CPE is physically located at the premises of the customer, any changes to the CPE results in a technician visit to the customer, resulting in higher costs and inconvenience. Furthermore, the CPE usually has to be replaced if a certain functionality or service is not supported by the CPE or if the CPE needs an upgrade resulting in an additional cost to the customer or the network operator. Furthermore, the CPEs are single function devices and the customer may not be able to enable and use multiple services and functionality using the same CPE.

Aspects of the disclosure disclose novel techniques for configuring and updating a CPE, such that the CPE can be remotely and dynamically configured, updated and upgraded, in a secure manner, with few or no visits to the customer premise by a technician.

Figure 1:
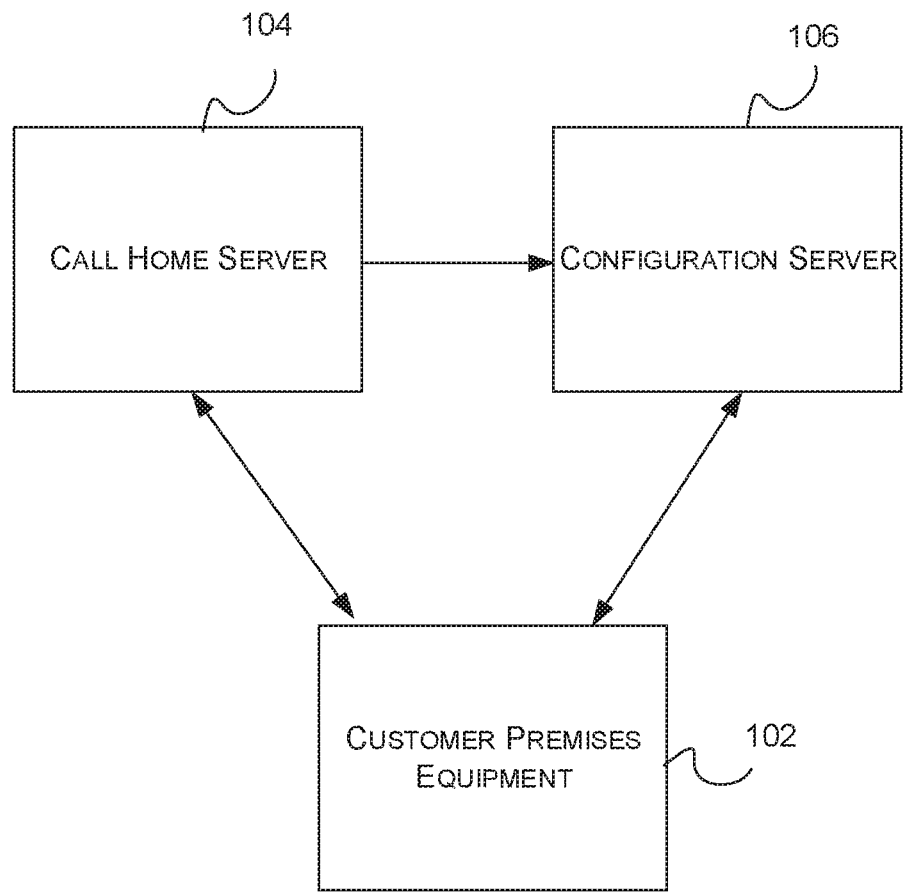
FIG. 1 illustrates an example system comprising an example customer premises equipment (CPE), a call home server and a configuration server.

FIG. 1 illustrates an example system comprising an example customer premises equipment (CPE) 102, a call home server 104 and a configuration server 106. The CPE 102 may be implemented according one or more aspects disclosed in this disclosure using techniques disclosed with respect to FIGS. 3-9. In some instances, according to certain aspects disclosed herein, the CPE 102 may be also be referred as a universal CPE (uCPE) or a virtual CPE (vCPE).

When the CPE 102 boots up using a base installation, it communicates with the call home server 104 and provides the call home server 104 with its IP address and other capability parameters. The call-home server 104 may communicate with the configuration server 106 and provide the appropriate configurations to the CPE 102. In some instances, the configuration server 106 and/or other devices, either individually or with other devices may also execute an Operating System Services, Back-office System Services (OSSBSS) system. OSSBSS may provide operations support over for the network operator's back-end services for billing, configuration, inventory, etc.

In some instances, a separate controller, such as Brocade Systems Controller (BSC) may be used as the call-home server and/or configuration server. In yet other implementations, the OSSBSS may also be implemented by the same or different controller.

Figure 2:
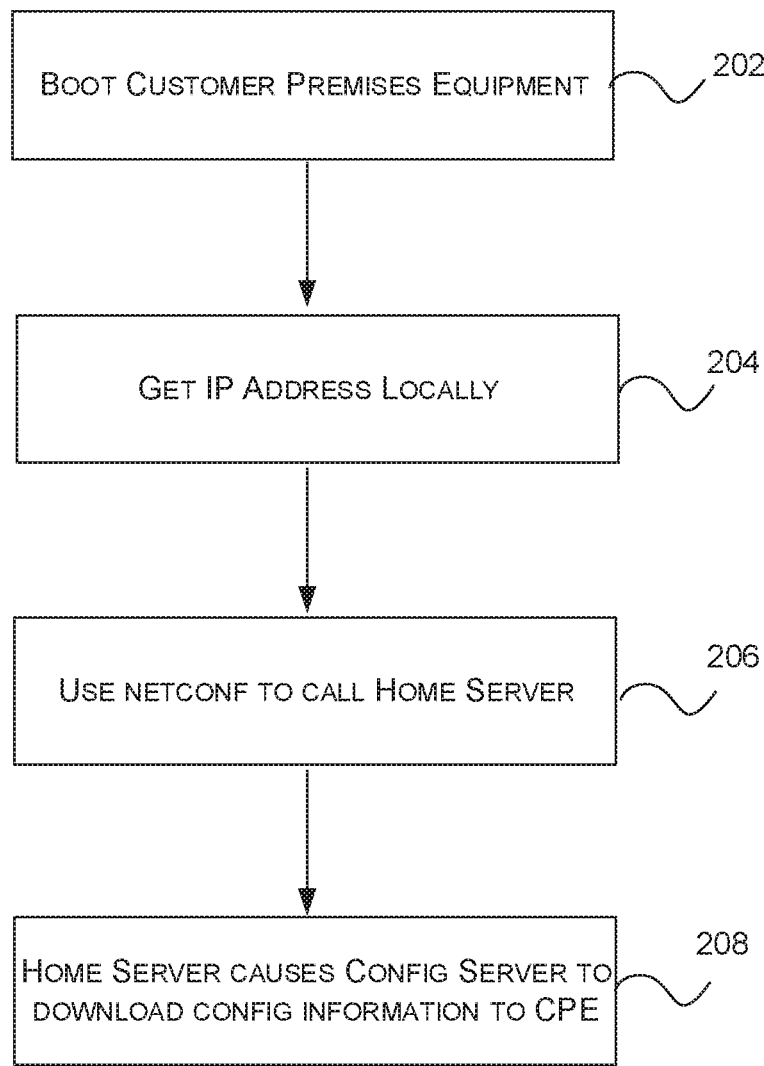
FIG. 2 is an example flowchart illustrating a method according to certain aspects of the disclosure for configuring the CPE.

FIG. 2 is an example flowchart illustrating methods according to certain aspects of the disclosure for configuring the CPE.

The CPE 102, residing remotely from the call-home server 104 associated with the network operator, may communicate with the call-home server 104. In one example configuration, the CPE 102 may be located at a customer site and the call-home server may reside at a server facility operated by the network operator. At block 202, the CPE 102 boots up using an initial boot up code sequence stored locally on the CPE 102.

At block 204, after the CPE 102 boots, it acquires its IP address locally through Dynamic Host Configuration Protocol (DHCP) or any other suitable means.

At block 206, in certain embodiments, the CPE 102 may be pre-provisioned to call the call-home server 104 and request its configuration. Other dynamic techniques may be used for discovering the identity of the call-home server 104 remotely by the CPE.

At block 208, the call-home server 104 may communicate with the configuration server 106 and indicate to the configuration server 106 one or more parameters associated with the CPE 102. For example, the call-home server 104 may communicate the IP address of the CPE, the hardware and/or software capabilities of the CPE 102, any service level agreement restrictions associated with the customer maintaining possession of the CPE 102, etc. to the configuration server 106. In response to the communication from the call-home server 106, the configuration server 106 may provide the CPE 102 with additional configuration information using a suitable protocol. Configuration information may include, but is not limited to, run-time parameters and/or executable code.

In certain embodiments, the configuration server 106 communicates the configuration information to the CPE 102 using a protocol, such as Network Configuration Protocol (NETCONF). NETCONF provides mechanisms to install, change, and manage the configuration of network devices using a simple remote procedure call (RPC) layer. In certain embodiments, the CPE 102 may communicate with the call-home server 104 using zerotouch NETCONF protocol. Zerotouch NETCONF protocol may provide techniques for establishing a secure NETCONF connection between a newly deployed CPE 102, configured with its factory default settings and the call-home server 104. Certain aspects of NETCONF and zerotouch NETCONF are defined by the standard established and maintained by internet engineering task force (IETF).

Figure 3:
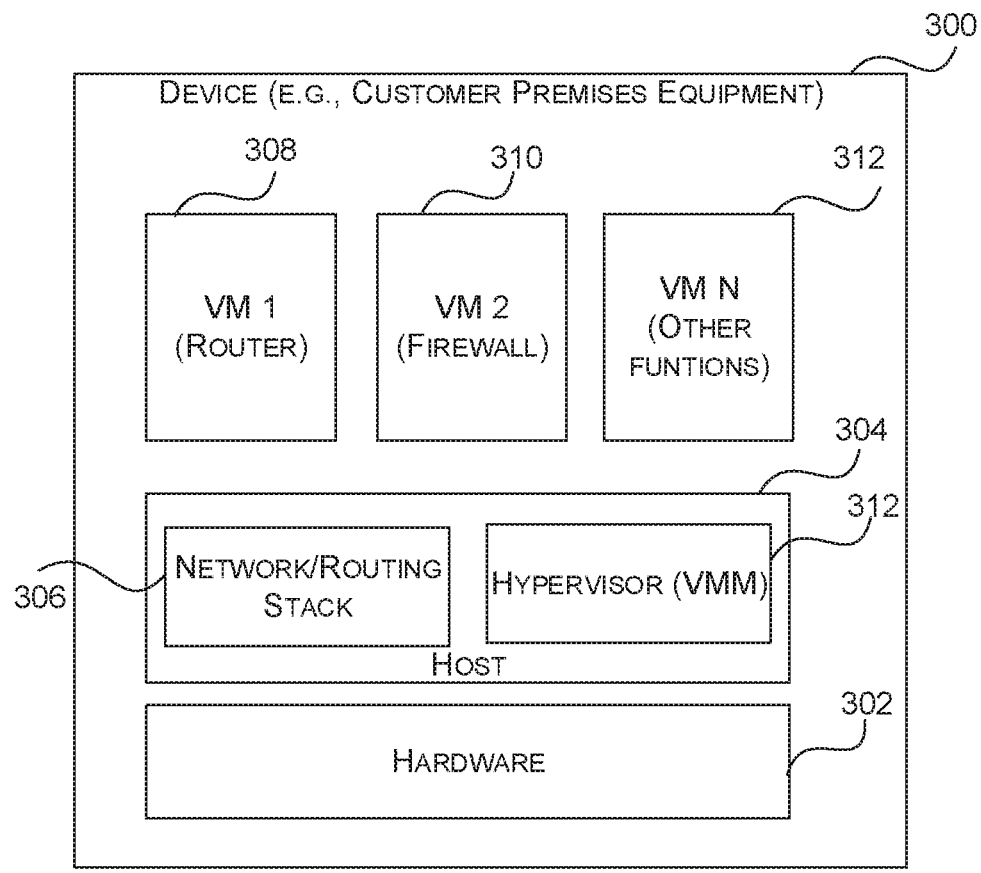
FIG. 3 is an example block diagram for illustrating certain aspects of an example CPE.

FIG. 3 is an example block diagram for illustrating certain aspects of an example CPE, according to certain aspects of the disclosure.

In certain embodiments, the CPE 300 may operate as a network device, having network capabilities, such as routing, switching and firewall capabilities for performing level 3 (L3) and level 2 (L2) processing and forwarding of network packets accordingly. The CPE 300 may implement network functionality in the network stack 306 as part of the host software stack (referred to host 304 in FIG. 3). The network stack 306 may be referred to as a router or routing stack.

As described herein, a router may refer to any logical routing entity that processes network packets and forwards them between physical or logical devices. Routers perform the "traffic directing" functions on the Internet. As referred to, throughout the specification, a router may be configured to perform routing operations, switching operations, firewall operations and/or any other suitable network operations on a network packet.

As described herein, a router may further provide for one or more of port-based and VLAN (virtual local area network)-based networking, L2 (layer 2) and L3 (layer 3) virtual private networks, internet accessibility, IPv4/IPv6 Routing, L2 (layer 2) and L3 (layer 3) COS (class of service), BFD (bidirectional forward detection). Reporting and service level agreements, simple network management protocol (SNMP), and SDN (software defined networking)-management.

A network packet typically comprises a header and payload. The payload may include data and the header for the network packet may include attributes that describe the contents of the payload, the route for the network payload, quality of service associated with the network packet, flow information, etc. A network packet is typically forwarded from one router to another through until it reaches its destination node. Furthermore, the network packet may refer to a packet at any layer of the OSI model, and may be interchangeably used with other terms, such as datagrams, protocol data unit, etc.

The network stack 306 may implement a router for routing and firewall functionality for the CPE 300. For example the network stack 306 may implement functionality associated with a control-plane and one or more data planes and/or vplanes. The control-plane and/or the data-planes may be implemented using one or more computing devices or components of the computing devices described with respect to FIG. 9. In certain embodiments, the CPE 300 may be implemented using one or more SDN (software defined networking) principles. In certain instances, network fiber may refer to a network topology for interconnecting several components for routing packets. In one implementation, the network stack 306 of the CPE 300 implements the data-plane aspects of the router for processing and forwarding of network packets and may communicate with a remote device for control-plane functionality.

The control-plane may be responsible for system configuration, management and exchange of routing table information. The control-plane may perform these tasks by generating and processing control-plane packets either destined to or originated by the components of the CPE 300, such as the data-planes. For example, the control-plane may exchange topology information with other network devices or systems and construct/maintain the routing table using routing protocols such as routing information protocol (RIP), open shortest path first (OSPF) or border gateway protocol (BGP). In some instances, the control-plane may be referred to as the management plane.

The control-plane may include one or more controllers for performing some of the functions described above. The one or more controllers may use one or more processing entities for processing control-plane packets.

The processing entity may refer to a physical processor, such as an Intel®, AMD®, or TI® processor, or an application specific integrated circuit (ASIC). In another embodiment, a processing entity may be a group of processors. In another embodiment, a processing entity may be a processor core of a multicore processor. In yet another embodiment, a processing entity may be a group of cores from one or more processors. A processing entity can be any combination of a processor, a group of processors, a core of a processor, or a group of cores of one or more processors.

The data-planes may be responsible for forwarding network packets to the next hop in the network based on the routing and configuration information received from the control-plane. In certain implementations, a data-plane may support layer 2 and layer 3 routing functionality associated with a routing entity, stateful and stateless firewalls, application flows, application logic gateways, Network Access Device (NAD) capability, and in some instances, partial or full implementations of layer 4 routing and higher level inspection capability. In some instances, data-plane may also be referred as a forwarding plane. The data-planes may be implemented using one or more processing entities as described above for processing packets received from the network through one or more interfaces or the control-plane with respect to the control-plane. Each data-plane may have one or more physical (e.g., network interface card, NIC) or virtual interfaces (e.g., local loopback). In certain implementations, the interface may be addressable by a port number.

Any combination of physical and virtual processing entities and one or more devices may be used in configuring the control-plane and the data-planes. For example, any of the control-planes and data-planes may be either physical entities or virtual entities operating on a single system or multiple systems to provide their respective functionality, without deviating from the scope of the invention.

At least in one example embodiment, the remote server operated by the network operator may provide control-plane functionality, whereas the CPE may provide data-plane functionality.

In addition to the network stack 306, FIG. 3 illustrates an example execution environment in which virtualization technology is used for performing embodiments described herein. Generally, "virtualization technology" may be used for providing isolation between different operating environments sharing the same physical resources. In other words, virtualization may provide a logical abstraction of computing resources from physical constraints. One common abstraction is referred to as a virtual machine (also known as guest), or VM, which provides the content running in the VM a direct interface to the physical hardware while maintaining the abstraction. Generally, virtualization technology allows multiple VMs running on the same physical hardware to operate independently and isolated from each other. The one or more VMs on the system are managed by a Virtualized Machine Monitor, or VMM 312 (also known as hypervisor). The VMM 312 is a software or firmware layer responsible for hosting and managing VMs. The VMM 312 usually executes at a higher privilege level than the VMs and manages the system's processor and memory, and allocates other resources for each VM. Generally, the software running directly on the device (i.e., not inside the VM's) may be referred to the host 304. In FIG. 3, the Network Stack 306, the Virtual Machine Monitor 312 and any other associated operating system or non-virtualized application processes and/or functions running on the system may be referred to as the host 304.

FIG. 3 illustrates device hardware 302 executing VMM 312. VMM 312 manages a first VM 308 (VM1), second VM 310 (VM2) and any additional VMs 312. Device hardware 302 may include one or more processors besides other components for operating a computing system, as described in further detail in FIG. 10. In certain implementations, the processors may include hardware support for virtualization technology. For example, INTEL® and AMD® brand processors provide hardware hooks that support virtualization technology. Qualcomm Incorporated® also provides a software abstraction layer which enables multiple operating systems and other clients to execute concurrently on a single processor, through the virtualization and portioning of physical hardware resources. As described above, certain processors may be architected to share hardware resources when possible, for more efficiently utilizing certain hardware components. For example, multiple processing cores may share caches and certain busses on the processor. Furthermore, in some implementations, multiple execution threads may operate on the same thread sharing the execution pipeline and level 1 and level 2 caches.

In certain embodiments, as shown in FIG. 3, VM1 308 may execute a router from the same or different vendor as the CPE provider for the CPE 300 and/or the network stack 306. Furthermore, in certain embodiments, the VM2 310 may execute a firewall for providing firewall functionality. In certain instances, the router executing in the host 304 or at least at a higher privilege level than the VM and as part of the network stack 306 may have additional functionality. Furthermore, the router implemented in the network stack 306 may have higher performance relative to the router implemented in the VM, since the network stack 306 may have direct access to the hardware, and more robust allocation of resources. For example, the operating system may dedicate real-time threads running in user space for the network stack 306 that may result in allocation of certain dedicated hardware resources, such as processor cores for routing, switching and firewall functionality at optimal performance.

In certain implementations, performing routing and switching functionality in the virtual machines may enable deployment of CPE with a full featured routing capability from the CPE provider. However, providing the capability of running routing, switching and networking functionality in the VM allows for flexibility after deployment of the CPE 300. For instance, if a customer wants to subscribe to a different service that requires certain routers with certain build versions not provided by the resident routing and switching in the network stack 306 of the CPE 300, in such instances, the CPE 300 can be remotely configured to download an image comprising the requisite router from any number of vendors and execute the routing and/or switching image in a VM.

Figure 4:
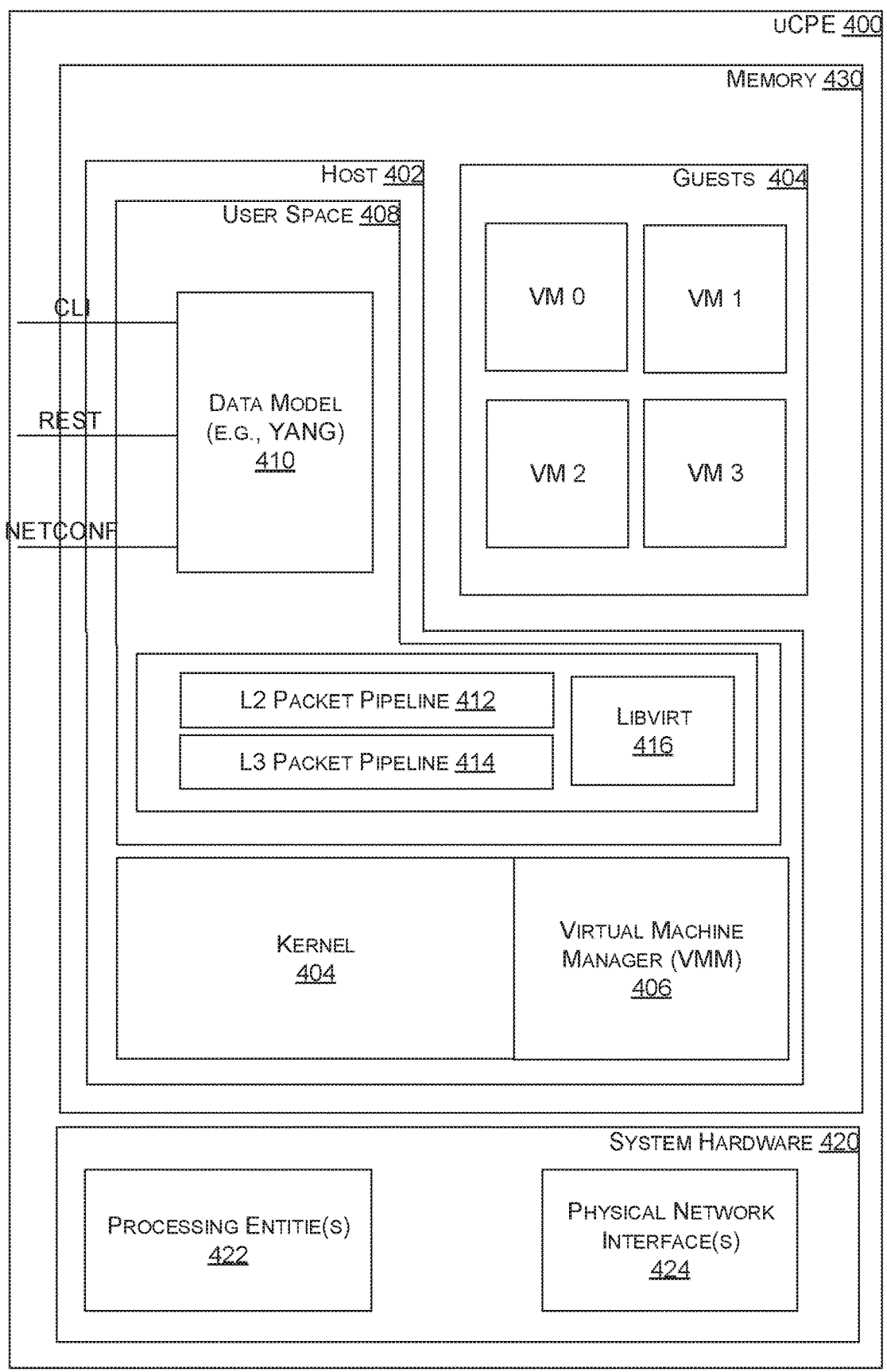
FIG. 4 is another example block diagram for illustrating certain aspects of an example CPE.

FIG. 4 is a more detailed block diagram illustrating an example CPE, according to certain aspects of the disclosure. As shown in FIG. 4, the CPE 400 may include memory 430 and system hardware 420. The system hardware 420 may include one or more processing entities 422 and physical network interfaces 424. The physical network interfaces 424 may provide the physical ports for transmitting and receiving network packets from the CPE. In other words, the physical network interface is the point of interconnection between the CPE and a private or public network. For example, an Ethernet port may be a physical network interface. The one or more processors 422 from the system hardware 420 may load software into memory 430 from a storage device 925 and/or the network for performing operations associated with the CPE 400.

The memory 430 may be logically partitioned into several regions, including kernel space (or kernel) 404 and the user space 408. Instructions loaded from the kernel space 404, when loaded in the one or more processing entities 422 may execute in kernel mode. Similarly, instructions loaded from the user space 408, when loaded in the one or more processing entities 422 may execute in the user mode.

Instructions executing from the kernel 404 in kernel mode may in some instances have higher privilege and may be able to execute privileged instructions, such as manipulating certain control registers associated with the processor.

In certain embodiments, a virtual machine manager (VMM) 406 may be implemented, added or run in conjunction with the kernel 404 to support a virtualized environment, as previously discussed. In such an environment, the kernel 404, the VMM 406 and portions of the user space 408 may be considered part of the host environment 402. The VMM 406 may manage one or more virtual machines (VM) or guests 404. In other words, the host 402 may include the VMM 406 and host the guests 404. The guests 404 may be considered part of the user space 408.

In certain embodiments, the CPE 400 may have a hardware supported virtualized environment or a software based virtualization environment (i.e., emulation) using Kernel based virtual machine (KVM) and/or Quick Emulator (Qemu). For example, KVM may allow virtualization of name spaces and virtualization of resources supported by the processor virtualization. On the other hand, Qemu emulates resources that the processor/kernel doesn't virtualize. For example, the Qemu emulates the networking interface card (NIC) interfaces.

In certain embodiments, LibVert 416 is used as an additional layer between the VMM 406 and the guests 404. In certain embodiments, LibVert 416 may provide application programmable interfaces (APIs) into the Qemu. Libvert also provides a toolset for managing virtualization functions, such as starting, stopping and managing VMs. In addition, in certain embodiments, according to aspects of the disclosure, LibVert commands are exposed through the data model 410 so that virtual machines can be managed remotely or through a connected terminal using operational mode commands, such as command line interface (CLI), representational state transfer (REST) and NETCONF. Using such operational mode commands, the virtual machine life cycle for one or more virtual machines 404 may be remotely managed by the configuration server 306 or the OSSBSS.

Operational mode commands may be used to expose certain state of the environment. In certain implementations, in operational mode a remote entity may reset certain resources, but may not be allowed to change configurations. Such configuration changes are performed in the configuration mode, based on the specific security context. In certain aspects, the VM-life cycle management, such as starting, stopping or changing VM configuration, may be performed through commands from the user space 408 by updating the data model 410, resulting in commands to VMs through the Libvirt 416. For example, using the operational mode commands, a user can log in and can start and manage a VM by modifying the data model parameters.

In certain instances, protocols such as Open Stack may be used for managing guests 404 directly through the LibVert 416 APIs. In certain other aspects of the disclosure, as briefly discussed above, instead of using a protocol such as Open Stack, all commands are sequestered through the data model 410 maintained by the host 402 in the user space 408. This may allow for tracking all the network actions performed with respect to the CPE 400 using one model, instead of tracking state in various state machines across the implementation over time, potentially leading to errors and out of sync propagation of state across the device.

In one implementation, the data model 410 may be implemented using the yet another next generation (YANG) model. YANG is a data modeling language for NETCONF. YANG can be used to model both configuration data as well as state data of network elements. Furthermore, YANG can be used to define the format of event notifications emitted by network elements. Therefore, a data model 410 implemented using YANG allows the CPE 400 the ability to maintain the transitional and static state using a unified model.

For example, in certain embodiments, all updatable operational mode state may be exposed as parameters using the user interface layers. Each of these parameters associated with the operational mode state is mapped into the data model 410. So, to add a new feature, like a DHCP server that may have an existing Linux daemon for it, the feature may be exposed to the user as a number of parameters mapped into the data model 410. So, any changes to the DHCP server are directly reflected in the data model 410. Implementation of such a unified data model 410 allows for better synchronization of various data elements in the system. For example, if a system daemon or a user accesses a data element, the true and current copy of the data element can be accessed by accessing the data model 410.

Furthermore, several aspects of the CPE 400 that support the networking infrastructure are implemented as part of the user space 408 to increase the responsiveness of the system.

Traditionally, a packet received at a physical network interface 424 at the kernel is processed in the kernel space by the Ethernet driver. The networking stack of the kernel may perform net filtering, routing and then send out the processed packet through a different physical network interface.

In contrast, as disclosed herein, the CPE 400 provides shadow interface drivers in the kernel. These shadow interface drivers are responsible for taking the packets and moving them to the user space packet pipelines (blocks 412 and 414), while incurring negligible costs to the kernel performance. In user space 408, the packet is processed using a real-time thread that is responsible for processing the network packets.

A "thread" may refer to a thread of execution on a processor or processing core and may include an ordered sequence of instructions or an instruction stream associated with a particular task. The kernel 404 may assign a real-time thread to a particular task. A real-time thread may execute using either higher priority than other threads or tasks or may be assigned dedicated resources. Traditionally, real-time threads are assigned to tasks such as audio or video that require constant throughput to avoid jitter.

In certain implementations, assigning a real-time thread to a particular task, such as processing a network packet, may result in assigning a physical core to the processing of that thread, resulting in a relatively jitter free and prioritized processing of the network packet. In yet other embodiments, the kernel 404 or the user space 402 code may assign affinity to the real-time thread, such that particular cores are assigned to the real-time thread. Furthermore, as the number of cores increase, since the cores are assigned as dedicated resources to the processing of specific tasks, the performance of the system can linearly increase with the number of cores.

An implementation as described above can avoid situations where tasks requiring lower latency and constant throughput, such as real-time tasks when processed in kernel space may get blocked by higher priority threads, such as the Kernel threads or other real-time threads resulting in poor performance of packet processing for even real-time packet processing tasks like VoIP. Therefore, aspects of the disclosure perform critical packet processing in the user space 408 by assigning real-time threads provided by the operating system in the user space 408.

In certain aspects, open build services of the kernel may be replaced with the Level 2 (L2) packet pipeline 412 and Level 3 (L3) packet pipeline 414 using real-time threads. In certain embodiments, the L2 packet pipeline 412 and the L3 packet pipeline 414 can communicate directly with the virtual machines. Such an implementation allows for L2 packet processing, L3 packet processing and inter-virtual machine communications. Therefore, instead of using V-switches, the virtual machines 404 can communicate with each other using the routing capabilities provided in the user space 408 of the host 402.

A V-switch is a virtual switch implemented under the Apache license. The implementation described above, may provide several advantages over VM communication provided through a V-switch. For example, the implementation described herein may provide better communication latency and lower jitter over the V-switch, especially on low-powered machines. For instance, the maximum performance through a V-switch is about 1.2 to 1.5 million packets per second, which is less than a Gigabyte of throughput. And traditionally on a low powered device, the throughput is about 200 mega-bytes using a V-switch. Therefore, instead of using V-switches, the virtual machines 404 can communicate with each other using the routing capabilities provided in the user space 408 of the host 402.

In certain situations, where two VMs may each implement a router and communicate with each other, traditionally the network packet arrives at the host 402 through the physical network interface 424, such as an Ethernet interface and is passed to the first router implemented in the first VM. For the first VM to communicate with the second router, the network packet goes back through the V-switch and to the second router, such as a firewall and goes back out the system. In such an implementation, the network functionality (Network Address Translation (NAT), Point of Service (POS), etc.) happens in the virtual machines.

In contrast, according to aspects of the disclosure, certain networking functions are handled by the user space 408 of the host 402 implemented by the CPE 400, itself Therefore, certain routing capabilities implemented in the VMs 404 can use networking functions implemented in the host 402, that may perform with much lower latency than then implementing all of the networking functionality in the virtual machines 404. Furthermore, the management ports can be configured in a similar fashion to any other network interfaces operating natively in a system. In certain aspects, the networking functionality implemented at the host 402 includes forwarding related functions, besides management related functions performed at the host 402 in traditional systems. Therefore, one of the routers is implemented in the host and the second router is implemented in the VM. The L2 and/or L3 packet pipeline may be used in communicating between the first router operating in the host and the second router operating in the VM.

Such an implementation allows flexibility for a CPE system, where after deployment of the system to the customer premise, the system can provide routing functionality using the native routing capabilities implemented as part of the host 402 or can augment or replace the network functionality by providing routing capabilities in the guests 402.

Aspects of the disclosure perform routing functions in the user space 408 of the host, using real-time threads, as opposed to the virtual machines or the kernel space of the host, significantly increasing the performance of the networking functions for packet processing and forwarding of packets.

Additionally, the CPE 400 may provide a comprehensive software platform to enable multiple services by the network operator or CPE provider, provide end-to-end "phone home" solution, for configuration download, lifecycle management and trouble shooting and provide seamless integration into SDN controller architecture.

VM-Lifecycle Management

Figure 5:
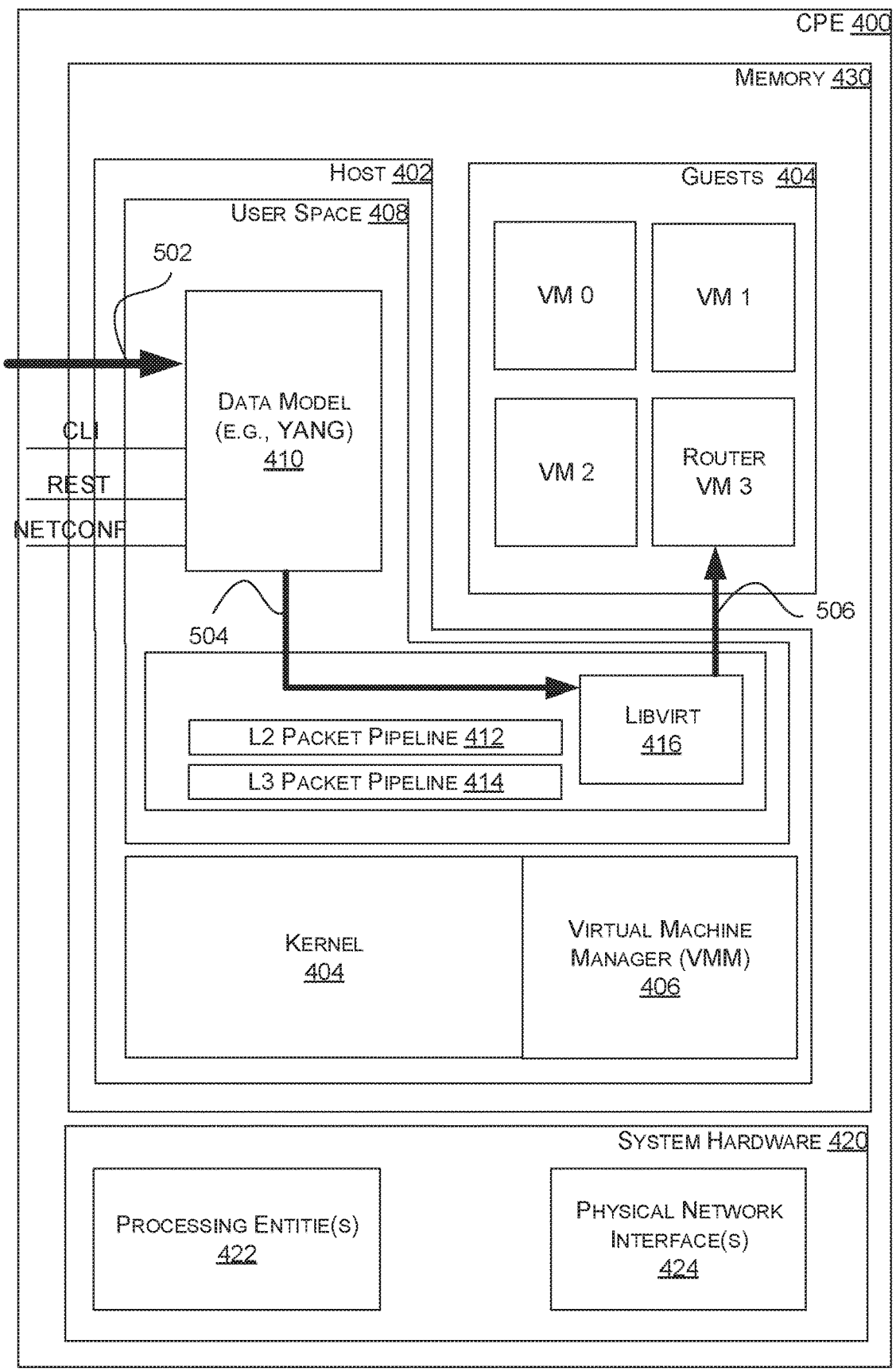
FIG. 5 is another example block diagram illustrating management of a virtual machine (VM) executing on a CPE, according to certain aspects of the disclosure.

FIG. 5 is another example block diagram illustrating management of a VM executing on a CPE, according to certain aspects of the disclosure. The bolded lines in FIG. 5 illustrates how an operational mode command may manage the operational mode state of a VM executing on the CPE. Operational mode commands may be used to access certain state of the device environment exposed by the data model 410. In certain implementations, using an operational mode command a remote entity may reset certain resources, but may not be allowed to change configurations. Such configuration changes are performed in the configuration mode, based on the specific security context. In certain aspects, VM-life cycle management operations, such as starting, stopping or changing VM configuration, may be performed through operational mode commands. In FIG. 5, bolded line 502 indicates the operational mode commands. Operational mode commands may be issued using a command line interface (CLI),), representational state transfer (REST), NETCONF or any other suitable means.

The operational mode commands update parameters of the data model 410. All commands are sequestered through the data model 410 maintained by the host 402 in the user space 408. This may allow for tracking all the network actions performed with respect to the CPE 400 using one model, instead of tracking state in various state machines across the implementation over time, potentially leading to errors and out of sync propagation of state across the device.

In one implementation, the data model 410 may be implemented using the yet another next generation (YANG) model. YANG is a data modeling language for NETCONF. YANG can be used to model both configuration data as well as state data of network elements. Furthermore, YANG can be used to define the format of event notifications emitted by network elements. Therefore, a data model 410 implemented using YANG allows the CPE 400 the ability to maintain the transitional and static state using a unified model.

For example, in certain embodiments, all updatable operational state represented in the data model 410 may be exposed as parameters using the user interface layers. Each of these parameters associated with the operational mode state is mapped into the data model 410. So, to add a new feature, like a DHCP server that may have an existing Linux daemon for it, the feature may be exposed to the user as a number of parameters mapped into the data model 410. Any changes to the DHCP server are directly reflected in the data model 410. Implementation of such a unified data model 410 allows for better synchronization of various data elements in the system. For example, if a system daemon or a user accesses a data element, the true and current copy of the data element can be accessed by accessing the data model 410.

In one embodiment, any changes made to the data model 410 related to the updates to the VMs are propagated (bolded line 504) to the LibVirt 416 library. The LibVirt library coordinates with the VMM 406 and updates the VM and the router executing inside the VM accordingly, as shown by bolded line 506.

In some embodiments, protocols such as open flow may be used to directly update the VMs. However, such out-ofband implementations of updating the VMs do not provide for a mechanism to synchronize the data model 410 to the changes being made to the VM or the router associated with the VM, risking the accuracy and completeness of the data model in representing the operational state of the CPE.

Native CPE Packet Processing

Figure 6:
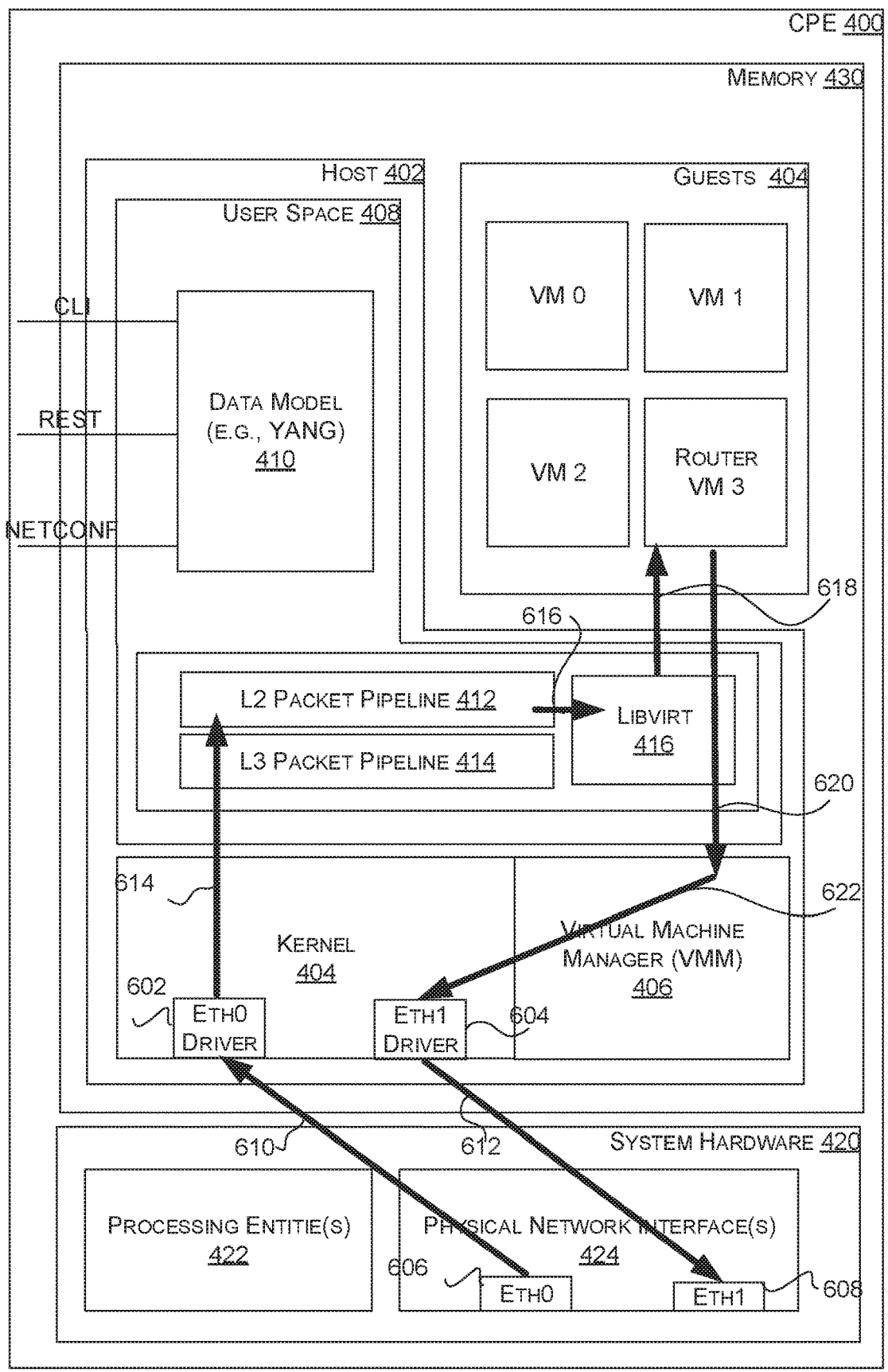
FIG. 6 is a block diagram illustrating routing functions performed by the CPE, according to certain aspects of the disclosure.

FIG. 6 is a block diagram illustrating routing functions performed by the CPE, according to at least certain aspects of the disclosure.

When shipped to the customer, according to aspects of the disclosure, the CPE 400 may provide native CPE packet processing. In other words, the router may be designed into the host 402 of the CPE 400. In some instances, the CPE 400 can provide routing capabilities, such as switching and routing without even setting up the virtual machines. However, either pre-installed or at any later point in time after the CPE 400 is deployed at the customer premise, a router may be installed or upgraded inside a VM.

Running the router natively in the host 402, as described herein, provides the CPE the ability to route network packets, as deployed, to the customer. The customer and/or the network operator can install another router in the VM to provide partial or full routing capability for the device.

According to aspects of the disclosure, the router executing in the host 402 in the CPE 400 may be optimized for performing packet processing. In certain embodiments, several aspects of the CPE 400 that support the networking infrastructure are implemented as part of the user space 408 to increase the responsiveness of the system.

Traditionally, a packet received at a physical network interface at the kernel is processed in the kernel space by the Ethernet driver. The networking stack of the kernel may perform net filtering, routing and then send out the processed packet through a different physical network interface.

In contrast, as disclosed herein, the CPE 400 provides shadow interface drivers in the kernel. These shadow interface drivers are responsible for taking the network packets and moving them to the user space packet pipelines (blocks 412 and 414), while incurring negligible costs to the kernel performance. FIG. 6 illustrates a network packet arriving at a physical network interface 424, such as Eth0 606 and invoking the Eth0 driver 602 executing in the kernel 404 (bolded line 610). The Eth0 driver 602 executing in the kernel 404 copies the network packet from the Eth0 606 to the user space 408 memory (bolded line 614).

In user space 408, the network packet is processed using a real-time thread that is responsible for processing the network packets. The L2 packet pipeline 412 or the L3 packet pipeline 414 may be used for processing of the network packets. FIG. 6 illustrates the Eth0 driver 602 transferring control to the L2 packet pipeline 412 and processing the packet.

In certain implementations, assigning a real-time thread to a particular task, such as processing a network packet, may result in assigning a physical core to the processing of that thread, resulting in a relatively jitter free and prioritized processing of network packets. In yet other embodiments, the kernel 404 or the user space 402 code may assign affinity to the real-time thread, such that particular cores are assigned to the real-time thread. Furthermore, as the number of cores increase, since the cores may be assigned as dedicated resources to the processing of network packets, the performance for packet processing can linearly increase with the number of cores.

An implementation as described above can avoid situations where tasks requiring lower latency and constant throughput, such as real-time tasks when processed in kernel space may get blocked by higher priority threads, such as the Kernel threads or other real-time threads resulting in poor performance of packet processing for even real-time packet processing tasks like VOIP. Therefore, aspects of the disclosure perform critical packet processing in the user space 408 by assigning real-time threads provided by the operating system in the user space 408.

Inter VM Communication

As shown in FIG. 6, a second router may be implemented in the VM 3 of the guests and the router from the host 402 of the CPE 400 may communicate with a router implemented in the VM. For example, in one implementation, the native router in the CPE 400 may perform routing functions and the second router in VM 3 may implement a firewall.

As shown in FIG. 6, after processing the packet in the L2 packet pipeline 412, the CPE 400 may shift control to the LibVirt 416 for transferring the network packet to the VM 3 for further processing. After processing the network packet, the second router in VM 3 may send the network packet out of the second physical network, such as Eth1 608 interface through LibVirt 416 and VMM 406 (line 620), Eth1 driver 604 (line 622), and then Eth1 608 (line 612).

Figure 7:
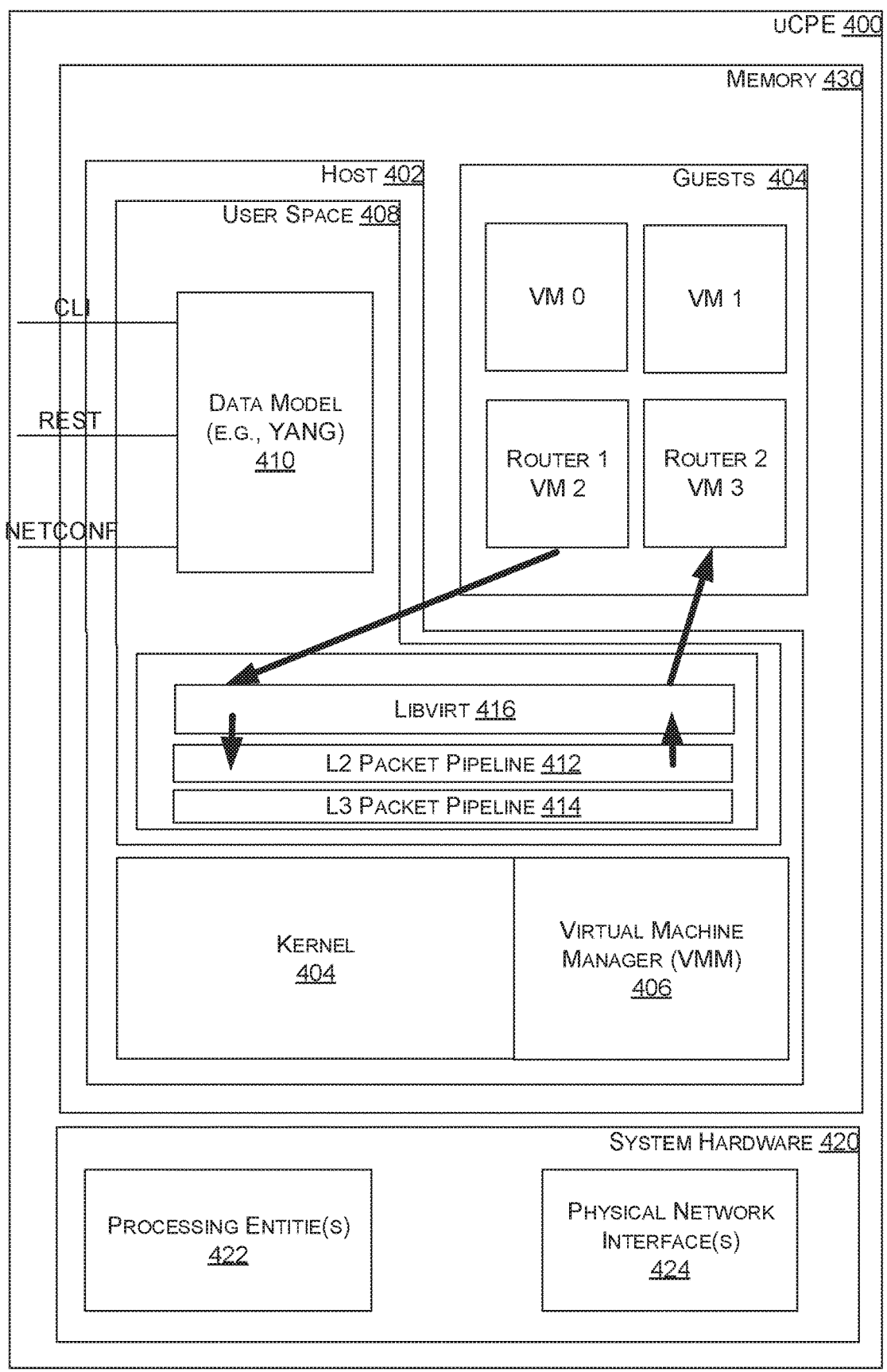
FIG. 7 is a block diagram illustrating inter VM communication, according to at least one embodiment of the disclosure.

FIG. 7 is a block diagram illustrating inter VM communication, according to at least certain aspects of the disclosure.

As shown in FIG. 7, a first router implemented in VM 2 may communicate with a second router implemented in VM 3. The communication may be routed through the LibVirt 416 to the appropriate packet pipeline and back through the Libert 416 to VM 3.

Traditionally, in such a setup a V-switch would be used for inter-VM communication. As previously discussed, a V-switch is a virtual switch implemented under the Apache license. The maximum performance through a V-switch is about 1.2 to 1.5 million packets per second, which is less than a Gigabyte of throughput. And traditionally, on a low powered device, the throughput is about 200 mega-bytes using a V-switch. Generally, the V-switch introduces a slow bottleneck while communicating between two VMs executing on the same device.

Therefore, instead of using V-switches, according to aspects of the disclosure, the VMs 404 can communicate with each other using the routing capabilities provided in the user space 408 of the host 402. The router or routing capabilities in the host 402 of the CPE 400 can be used for routing packets between the VMs. More specifically, the L2 and L3 packet pipelines may be used as bridges for inter-VM communication at much higher speeds than the V-switch. The L2 and L3 packet pipelines can enable faster inter-VM communication than V-switch, at least since the processing of the packets are assigned real-time threads in user space, as described in more detail previously.

Figure 8:
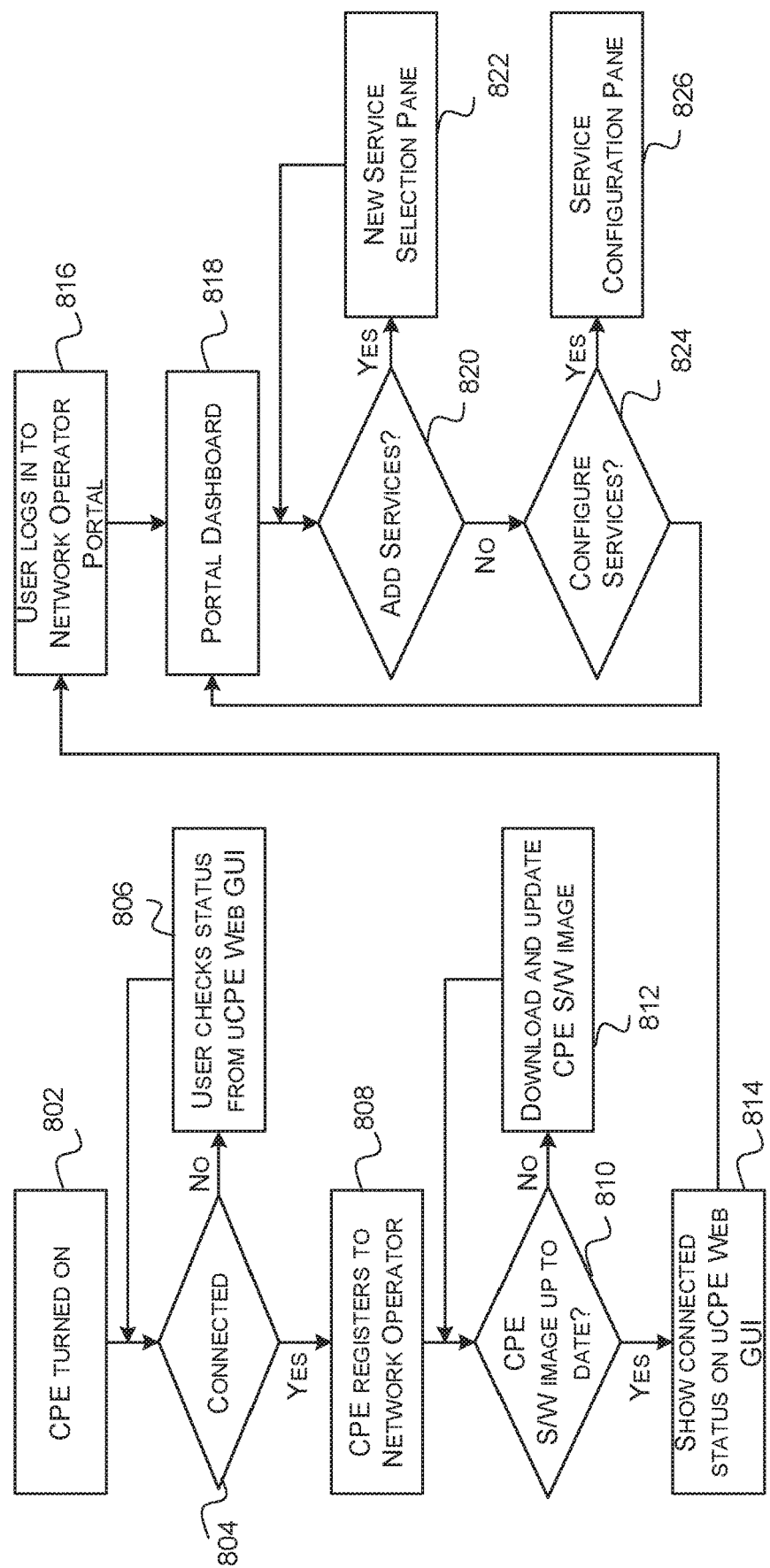
FIG. 8 is an example flowchart illustrating methods according to certain aspects of the disclosure for a deployment model for a CPE.

FIG. 8 is an example flowchart illustrating certain aspects of the disclosure for a deployment model for a CPE.

At block 802, a CPE deployed to at a customer premise is turned on and boots up using a resident firmware/software image from the CPE itself and acquires its IP address. The CPE may acquire its IP address using DHCP protocol. At block 804, if the CPE is not connected to a remote server maintained by the network operator, a user may locally check the states of the CPE using a web graphics user interface (GUI), at block 806. A remote server associated with a network operator may be a call home server, a configuration server or any other server.

At block 808, if the CPE can connect to the remote server, the CPE registers itself with the network operator. For instance, the CPE may uniquely identify itself as a device operated or maintained by the network operator prior to registering itself with the network operator.

At block 810, the CPE software/firmware image may be checked to determine if it is up to date. For instance, in one implementation a hash and/or version of the resident image on the CPE may be compared against a hash and/or version of the latest image from the network operator. The communication regarding the updated version and its hash may be performed over a secure communication channel between the CPE and the remote server. If the software/firmware image currently installed on the CPE is either out of date or corrupted, at block 812, the network operator may download the updated software/firmware image on to the CPE. At block 814, once the CPE software/firmware is updated the CPE GUI may display a connected and/or ready status.

At block 816, a network user may log in to a network portal provided by the network operator for configuring and maintaining CPEs. The network user may access the portal dashboard (block 818) associated with a particular CPE. At block 820, based on input from the network user, the network portal can determine if the network user intends to add services associated with the CPE (at block 820) and take the network user to the new services selection pane (block 822). Similarly, based on input from the network user, at block 824, the network portal can determine if the network user intends to configure services and take the network user to the service configuration pane (block 826). Once a new configurations and services are determined, the network operator may tag the CPE for an upgrade/update on the next boot-up of the CPE. In some instances, the network user may force a reboot on the CPE.

Figure 9:
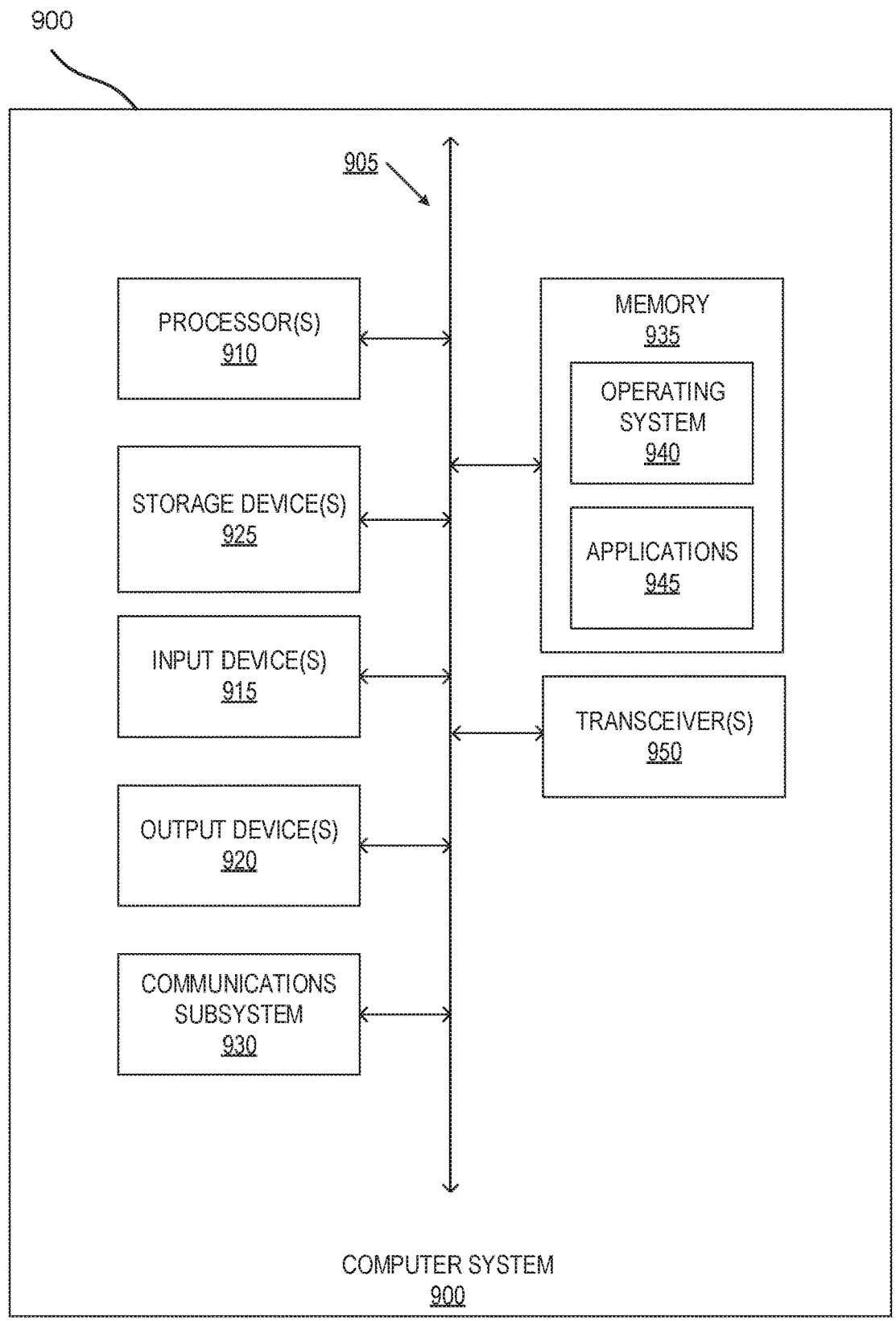
FIG. 9 is a block diagram of a computer system, according to some embodiments.

Having described multiple aspects of a CPE 300 and CPE 400, an example of a computing system in which various aspects of the disclosure may be implemented will now be described with respect to FIG. 9. According to one or more aspects, a computer system as illustrated in FIG. 9 may be incorporated as part of the CPE 300 and 400, which may implement, perform, and/or execute any and/or all of the features, methods, and/or method steps described herein. For example, computer system 900 may represent some of the components of the CPE 300 or CPE 400. In some embodiments, the system 900 is configured to implement any of the methods described above. FIG. 9 provides a schematic illustration of one embodiment of a computer system 900 that can perform the methods provided by various other embodiments, as described herein, and/or can function a network device or components of a network device or distributed network system 300. FIG. 9 is meant only to provide a generalized illustration of various components, any and/or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a wireless receivers, wireless sensors, a mouse, a keyboard and/or the like; and one or more output devices 920, which can include without limitation a display unit, a printer and/or the like.

In some embodiments, the one or more processor 910 may be configured to perform a subset or all of the functions described above with respect to FIG. 9. The processor 910 may comprise a general processor and/or and application processor, for example. In some embodiments, the processor is integrated into an element that processes visual tracking device inputs and wireless sensor inputs.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a non-transitory working memory 935, which can include a RAM or ROM device, as described above. In some embodiments communications subsystem 930 may interface with transceiver(s) 950 configured to transmit and receive signals from access points or mobile devices. Some embodiments may include a separate receiver or receivers, and a separate transmitter or transmitters.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 9, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 900) to perform methods in accordance with the disclosure. For example, some or all of the procedures of the described methods may be performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein, for example methods described with respect to FIG. 8.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communications subsystem 930 (and/or the media by which the communications subsystem 930 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk, optical disc or solid state disk of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 930 (and/or components thereof) generally will receive the signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910. Memory 935 may contain at least one database according to any of the databases and methods described herein. Memory 935 may thus store any of the values discussed in any of the present disclosures, including FIGS. 1-8 and related descriptions.

In some implementations, the computer system 900, such as the CPE discussed in previous figures may use an X86 based architecture for its processing needs. However, embodiments of the invention are not limited to an X86 based architecture. In certain embodiments, the computer system 900 may be implemented in a 1-2 rack unit (RU) form factor. In certain embodiments, the computer system may be implemented using commercial off-the-shelf (COTS) or COGS components to contain costs.

The methods described herein may be implemented by various blocks in FIG. 9. For example, processor 910 may be configured to perform any of the functions of blocks in flowcharts. Storage device 925 may be configured to store an intermediate result, such as a globally unique attribute or locally unique attribute discussed within any of blocks mentioned herein. Storage device 925 may also contain a database consistent with any of the present disclosures. The memory 935 may similarly be configured to record signals, representation of signals, or database values necessary to perform any of the functions described in any of the blocks mentioned herein. Results that may need to be stored in a temporary or volatile memory, such as RAM, may also be included in memory 935, and may include any intermediate result similar to what may be stored in storage device 925. Input device 915 may be configured to receive wireless signals from satellites and/or base stations according to the present disclosures described herein. Output device 920 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. A number of steps may be undertaken before, during, or after the above elements are considered. Accordingly, the above description does not limit the scope of the disclosure.

Various examples have been described. These and other examples are within the scope of the following claims.

What is claimed is:

1. A method for forwarding network packets at a device, comprising:
   implementing a first router in a host software stack of the device, the first router providing a first routing functionality, the first routing functionality including functionality provided by executing one or more real-time threads;
   providing a second router that provides a second routing functionality by instantiating a virtual machine that implements the second routing functionality;
   providing, in a user space of a memory of the device, a plurality of processing pipelines for enabling communications between the first router and the second router, the plurality of processing pipelines including a first processing pipeline for performing Layer 2 (L2) packet processing and a second processing pipeline for performing Layer 3 (L3) packet processing;
   receiving, at a network port of the device, a network packet;
   forwarding the network packet using the first routing functionality by processing the network packet using the first processing pipeline or the second processing pipeline;
   accessing, via the virtual machine, the network packet;
   processing, via the second routing functionality of the virtual machine, the network packet;
   receiving a second network packet at the network port;
   copying the second network packet to a particular processing pipeline from the plurality of processing pipelines; and
   forwarding, by the second router, the second network packet by accessing the second network packet from the particular processing pipeline.

2. The method of claim 1, wherein processing the network packet via the second routing functionality of the virtual machine comprises transmitting the network packet through another network port.

3. The method of claim 1, wherein processing the network packet using the first processing pipeline or the second processing pipeline comprises sending the network packet to the virtual machine.

4. The method of claim 1, further comprising:
   receiving an operational mode command from a remote device;
   updating parameters of a data model based on the operational mode command, wherein the data model comprises an interface for exposing updatable parameters associated with the virtual machine; and
   updating a state associated with a software routing functionality of another router based on the parameters of the data model.

5. The method of claim 1, wherein the device is a customer premises equipment.

6. The method of claim 1, wherein the device is a network device.

7. The method of claim 1, wherein processing the network packet via the second routing functionality of the virtual machine comprises performing routing or switching of the network packet.

8. The method of claim 1, further comprising:
   enabling the device to provide a third routing functionality corresponding to a third router by instantiating an additional virtual machine that implements the third router,
   wherein forwarding the second network packet comprises routing the second network packet from the second router to the third router using one or more processing pipelines from the plurality of processing pipelines.

9. The method of claim 1, wherein the device is a customer premises equipment (CPE) device located at a subscriber's premises and connected to a network of a network operator or a telecommunication carrier.

10. A non-transitory computer-readable storage medium, wherein the non-transitory computer-readable storage medium comprises instructions executable by a processing entity of a device for:
    implementing a first router in a host software stack of the device, the first router providing a first routing functionality, the first routing functionality including functionality provided by executing one or more real-time threads;
    providing a second router that provides a second routing functionality by instantiating a virtual machine that implements the second routing functionality;
    providing, in a user space of a memory of the device, a plurality of processing pipelines for enabling communications between the first router and the second router, the plurality of processing pipelines including a first processing pipeline for performing Layer 2 (L2) packet processing and a second processing pipeline for performing Layer 3 (L3) packet processing;
    receiving a network packet at a network port;

forwarding the network packet using the first routing functionality by processing the network packet using the first processing pipeline or the second processing pipeline;
accessing, via the virtual machine, the network packet;
processing, via the second routing functionality of the virtual machine, the network packet to an external device;
providing a third router that provides a third routing functionality by instantiating a second virtual machine that implements the third router;
receiving a second network packet at the network port; and
forwarding, using the second router, the second network packet by routing the second network packet to the third router using one or more processing pipelines from the plurality of processing pipelines.

11. The non-transitory computer-readable storage medium of claim 10, wherein processing the network packet using the first processing pipeline or the second processing pipeline comprises sending the network packet to the virtual machine.

12. The non-transitory computer-readable storage medium of claim 10, wherein the device is a customer premises equipment.

13. A device comprising:
a memory configured for storing instructions;
a network port for receiving and transmitting network packets; and
one or more processors configured to:
implement a first router in a host software stack of the device, the first router providing a first routing functionality, the first routing functionality including functionality provided by executing one or more real-time threads;
providing a second router that provides a second routing functionality by instantiating a virtual machine that implements the second routing functionality;
provide, in a user space of a memory of the device, a plurality of processing pipelines for enabling communications between the first router and the second router, the plurality of processing pipelines including a first processing pipeline for performing Layer 2 (L2) packet processing and a second processing pipeline for performing Layer 3 (L3) packet processing;
receive a network packet from the network port;
forward the network packet using the first routing functionality by processing the network packet using the one or more real-time threads using the first processing pipeline or the second processing pipeline;
access, via the virtual machine, the network packet; and
process, via the second routing functionality of the virtual machine, the network packet to an external device;
enable the device to provide third routing functionality corresponding to a third router by instantiating an additional virtual machine that implements the third router;
receive a second network packet at the network port; and
forward the second network packet by routing the second network packet from the second router to the third router using one or more processing pipelines from the plurality of processing pipelines.

14. The device of claim 13, wherein forwarding the network packet comprises sending the network packet the virtual machine.

15. The device of claim 13, wherein the device is a customer premises equipment.

16. The device of claim 13, wherein the one or more processors are further configured to:
move the second network packet to a particular processing pipeline from the plurality of processing pipelines, wherein forwarding the second network packet using the second router comprises accessing, by the second router, the second network packet from the particular processing pipeline.

17. The device of claim 13, wherein the device is a customer premises equipment (CPE) device located at a subscriber's premises and connected to a network of a network operator or a telecommunication carrier.

* * * * *